United States Patent [19]

Solin et al.

[11] Patent Number: 5,699,215
[45] Date of Patent: Dec. 16, 1997

[54] NON-MAGNETIC MAGNETORESISTIVE READING HEAD USING A CORBINO STRUCTURE

[75] Inventors: Stuart A. Solin, Princeton Junction; Ned Scott Wingreen, Princeton, both of N.J.

[73] Assignee: NEC Research Institute, Inc., Princeton, N.J.

[21] Appl. No.: 814,690

[22] Filed: Mar. 11, 1997

Related U.S. Application Data

[63] Continuation of Ser. No. 396,819, Mar. 2, 1995, abandoned.
[51] Int. Cl.⁶ ................................................. G11B 5/127
[52] U.S. Cl. ................................................. 360/113
[58] Field of Search ........................ 360/113; 338/32 R

[56] References Cited

U.S. PATENT DOCUMENTS 3,617,975  11/1971  Weider ............................. 338/32 R

OTHER PUBLICATIONS

David A. Thompson et al, "Thin Film Magnetoresistors in Memory, Storage, and Related Applications," IEEE Trans. on Magnetics, vol. MAG–11, No. 4, Jul. 1975.

M. Isai, et al, "Preparation and crystal properties of thin InSb films for highly sensitive magnetoresistance elements," J. Mater. Res, vol. 1, No. 4, Jul./Aug., 1986, pp. 547–551.

*Primary Examiner*—John H. Wolff
*Assistant Examiner*—David D. Davis
*Attorney, Agent, or Firm*—Jeffery J. Brosemer; Arthur J. Torsiglieri

[57] ABSTRACT

A non-magnetic magnetoresistive head for reading a magnetic pattern stored as domains in tracks on a storage device uses as the sensor a wafer of a high electron mobility non-magnetic semiconductor, such as indium antimonide or mercury-cadmium telluride, which includes an electrode configuration that includes an inner stripe electrode and an outer rectangular electrode surrounding the inner electrode. The wafer is supported so that the plane of the wafer is parallel to the disk and perpendicular to the magnetic field being sensed.

6 Claims, 2 Drawing Sheets

NON-MAGNETIC MAGNETORESISTIVE READING HEAD USING A CORBINO STRUCTURE

This is a continuation of application Ser. No. 08/396,819 filed Mar. 2, 1995 now abandoned.

FIELD OF THE INVENTION

This invention relates to magnetoresistive elements and more particularly relates to heads for reading magnetic patterns stored on magnetic disks or comparable magnetic storage devices.

BACKGROUND OF THE INVENTION

As magnetic storage devices are made to store more and more information, the density of such stored information has become higher and higher. To this end, the dimensions of the regions of aligned magnetic moments that constitute the stored information have had to become smaller. The stored pattern that is read is the external magnetic field that results from changes in the direction of the aligned magnetic moments and this field has become smaller as the regions of aligned magnetic moments have become smaller. This has created a need of greater and greater sensitivity for heads for reading the stored pattern.

Currently there are two types of reading head in common use, inductive and magnetoresistive. Although both magnetic and non-magnetic materials exhibit magnetoresistance, to date reading heads have generally been fabricated from magnetic materials such as Ni—Fe, Ni—Co or $Fe_3O_4$. The resistance of such materials depends on the alignment of the magnetic moment in the head material relative to the direction of the sensing current in the head. As the reading head scans the track in which the magnetic pattern is stored, the magnetic field variations resulting from this pattern cause the magnetic moments in the head to realign. This realignment gives rise to detectable changes in the resistance of the head. In magnetic magnetoresistive sensors, the sensing material has been formed as a layer that is suitably supported on a support member such that its plane is perpendicular to the plane of the magnetic recording medium. The pair of electrodes between which the resistance variations are measured are positioned such that the electric field established in the film by a voltage maintained between the electrodes is nominally in the plane of the layer and perpendicular to the direction of the changing magnetic field. Since these layers are typically of a conductive material, such as a metal, the resistance between the electrodes tends to be small and impedance matching to the associated detecting circuitry, which is important for good efficiency, is relatively difficult.

A magnetoresistive form of reading head senses flux rather than a time derivative of flux which makes it preferable to the inductive form of reading head since it makes the magnetoresistive response independent of the media velocity or the time rate of change of the field being measured. However, technological film deposition constraints limit the minimum height of magnetic magnetoresistive heads to about 4 micrometers which limits their (unshielded) resolution to about one half of that value. Resolution can be improved by magnetic shielding but this significantly complicates head design and/or reduces sensitivity. Magnetic magnetoresistive heads also require biasing which adds additional complications to head design. There was also proposed earlier, for use as the magnetoresistive sensing element in a magnetic field sensor, a high-electron mobility compound semiconductor, such as indium antimonide. The magnetoresistance of such a material results from field alterations of charge-carrier motion induced directly by the applied magnetic field in contrast to the indirect perturbations associated with the field induced changes of the permanent magnetic moments in magnetic magnetoresistive materials. Non-magnetic magnetoresistive materials can be made both to have a high resistance R, which facilitates good impedance matching to the measuring apparatus, and a high magnetoresistive value $$\frac{\Delta R}{R}.$$

See a paper entitled "Preparation and crystal properties of thin InSb films for highly sensitive magnetoresistance elements" that appeared in J. Mat. Res. 1(4) July/August 1986. However, non-magnetic magnetoresistive sensors of this kind appear not to have found wide acceptance, possibly because they have not been sufficiently sensitive when used in the same configuration as that of the metallic magnetic materials.

As indicated above, the changes in the magnetoresistance of a magnetic magnetoresistive layer of a reading head as the head scans a track for the stored pattern generally has been measured by a pair of electrodes positioned at opposite ends of the active layer, because of the relative simplicity of this construction. However, an alternative configuration that has long been known for use in the measurement of resistive changes in a non-magnetic magnetoresistive element is the Corbino structure. In a Corbino structure the electrode configuration includes a central electrode and an annular electrode that surrounds the central electrode, typically, but not necessarily, in a disk shaped dot and ring geometry. However, such a configuration appears not to have been proposed in a reading head for scanning a magnetic pattern, particularly when the tracks of the pattern contain very closely spaced magnetic domains.

SUMMARY OF THE INVENTION

The invention is a head for reading fine, closely spaced magnetic patterns in which the active layer advantageously is a homogeneous crystalline non-magnetic magnetoresistive wafer of a compound semiconductor, such as indium antimonide or mercury cadmium telluride, that exhibits, at the temperature intended for operation, generally room temperature, a high sensitivity to magnetic field variations, and in which the electrode configuration associated with the wafer is a Corbino structure. In particular, the electrode structure comprises an inner electrode, preferably an elongated stripe, and an outer electrode, surrounding the inner electrode and preferably rectangular in shape, for providing a fairly uniform separation from the elongated stripe. The shorter inside dimension of the rectangular outer electrode, which essentially defines the active width of the reading head, can be as small as 500 Angstroms, although more typically about 1000 Angstroms, which is more than adequate to resolve magnetic field variations due to the magnetic domains that form the storage pattern being scanned. Moreover, the wafer is supported in the reading head such that its plane lies parallel to the plane of the storage medium and normal to the external magnetic field resulting from the reversals of the domain pattern being scanned. This increases the efficiency of the reading action since it permits the full width of the active layer to be equally close to the storage pattern, where the field changes are maximal. In addition, not only does such a head design have enhanced sensitivity relative to magnetic magnetoresistive heads, it also obviates the need for magnetic shielding and/or biasing.

DETAILED DESCRIPTION OF THE INVENTION

Figure 1:
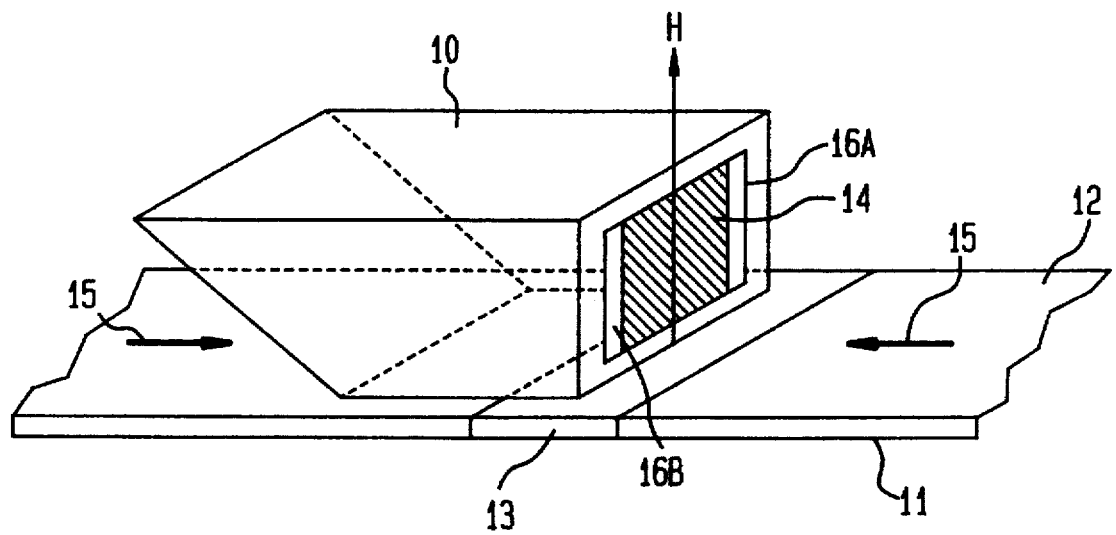
FIG. 1 shows in perspective the prior art magnetic magnetoresistive form of reading sensor and its relation to the stored pattern.

With reference now to the drawing, there is shown the active portion of a reading head 10 positioned over a disk 11 for reading the magnetic pattern stored in its tracks 12 in accordance with the prior art. The reading head includes as the active sensing element a layer 14 of magnetic magnetoresistive material on a suitable substrate (not shown) and the tracks 12 typically form concentric circles on the disk 11. The reading head is supported by means (not shown) that include provision for moving the head so that the layer 14, the active sensing element, overlies the track on which is stored the particular information to be retrieved. The information is stored as variations in the external magnetic fields H above the transition region 13 between directional changes of the aligned magnetic moments 15 that extend along the tracks 12 of the magnetic medium.

In this arrangement, different heights of the active layer 14 are spaced different distances from the surface of the magnetic pattern being read. This tends to reduce the strength of the average external magnetic field H sensed by the active layer since such magnetic field decreases rapidly with increasing distance from the magnetic pattern. The active layer 14 is provided with a pair of electrodes 16A and 16B of a suitable conductor at opposite edges by means of which there can be created an electric field E and a corresponding sensing current in the plane of the layer that is normal to the external magnetic fields H that are established along the track by the reversals in the domains of the stored pattern. These fields lie in the plane of the layer. The changes in resistance between the electrodes 16A and 16B in response to the changes in magnetic field H are detected and amplified to read the information stored in the pattern.

Figure 2:
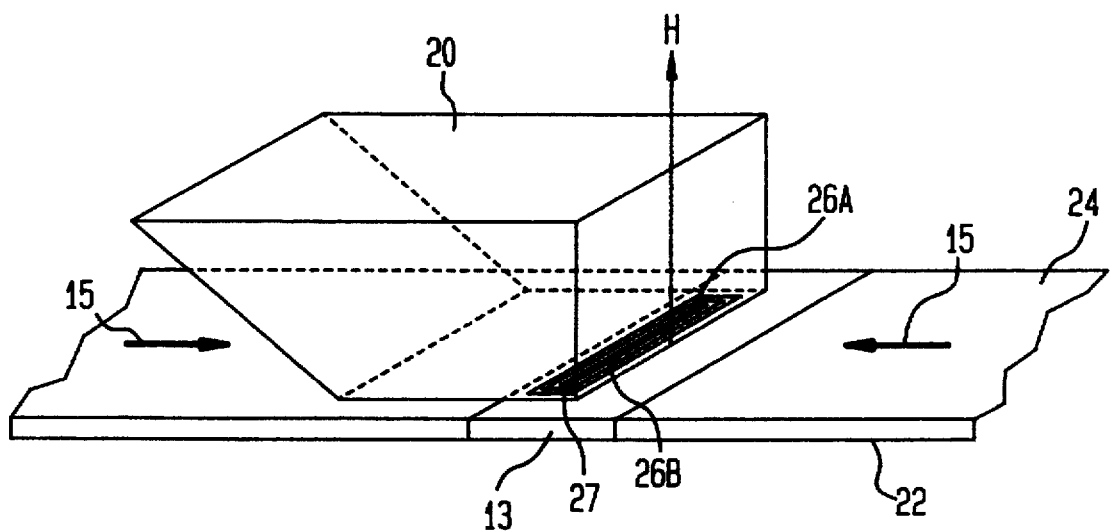
FIG. 2 shows a non-magnetic magnetoresistive semiconductor form of reading sensor in accordance with the invention and its relation to the stored pattern.

FIG. 2 shows a magnetic sensor arrangement in accordance with a preferred embodiment of the invention. The active magnetoresistive element is provided as a Corbino structure including a thin wafer 27 mounted on the bottom surface of a suitable carrier 20 and the electrodes 26A and 26B on the bottom surface of the wafer. In this sensor the wafer is of a non-magnetic crystalline compound semiconductor characterized by a high electron mobility that provides a strong magnetoresistive effect. Again the wafer and attached electrodes 26A and 26B are positioned over a disk 22 that includes the stored pattern as a series of magnetized domains in tracks 24. In this arrangement, however, the active magnetoresistive element is oriented so that the external magnetic field H being read over the transition region 23 passes through this element largely perpendicular to its plane.

The electrode structure affixed to the surface of the wafer adjacent to the disk 22 consists of an inner stripe electrode 26A and a surrounding rectangular electrode 26B of a suitable conductor. A suitable voltage is established between the two electrodes whereby there is created an electric field and sensing current therebetween that lies in the plane of the wafer largely normal to the magnetic fields that are intercepted by the wafer. Again changes in the resistance measured between the electrodes are amplified as representations of the stored information.

It can be appreciated that the long dimension of the active portion of the Corbino structure transverse to the track should not be greater than the width of the track to avoid cross-talk with adjacent tracks. The crystalline compound semiconductor advantageously is non-magnetic, although it needs to exhibit a magnetoresistive characteristic. As known to workers in the art, when the magnetic field is perpendicular to the Corbino structure this characteristic is proportional to the square of the applied magnetic field strength and to the square of the electron mobility so that the non-magnetic semiconductor chosen should be one with a high electron-mobility at the operating temperature of the contemplated application, typically room temperature. A monocrystalline wafer of indium antimonide, preferably undoped for maximum room temperature electron mobility, is a suitable material. Various other compound semiconductors are known that have electron mobilities of at least $5 \times 10^4$ cm$^2$/V sec., which should be a suitable lower limit.

It is also important that the semiconductive wafer have a suitable series resistance between its electrodes at the temperature of operation for good impedance matching with the detection circuitry. A resistance of about 20 ohms is typically considered preferable.

The desired series resistance measured between the electrodes can be achieved readily by the choice of the geometries of the wafer and of the electrode configuration. Also thinning of the wafer in the portion enclosed by the outer electrode is one expedient for increasing the resistance and doping the wafer to make it more conductive is an expedient for decreasing the resistance.

In particular, achieving the desired resistance is favored when the electrode configuration includes an elongated inner electrode and an enclosing outer electrode that is rectangular with relatively uniform spacing between the two electrodes along the full length of the inner electrode. In particular, the inner electrode is aligned so that it extends in the direction transverse to the direction of travel of track as the disk rotates. The long dimension of the rectangular electrode typically closely matches the width of the track, e.g. about 5 microns while the narrow dimension preferably should be between 500 and 1000 Angstroms. The width of the inner electrode should be as thin as is convenient to construct.

In some instances, it may prove desirable to start with a wafer of sufficient size that it has the requisite size and mechanical strength to be easily handled and to define the active region of the wafer to a desired size by the geometry of the outer electrode and to tailor the resistance to a desired value by thinning the wafer in the active region by removing material from the back side of the wafer.

We believe that an appropriate figure of merit for comparison of various magnetoresistive materials is $$\frac{\Delta R}{R} = \left[ \frac{R(H) - R_0}{R_0} \right]_{H_R}$$

where R(H) is the resistance in the presence of magnetic field of strength H, $R_0$ is the zero field resistance and $H_R$ is the field strength being sensed in the application to which the figure of merit is applicable. The fractional change in the resistance resulting from the applied field, $$\frac{\Delta R}{R},$$

is the quantity that is actually sensed in the typical case.

The vertical geometry for the active layer shown in the arrangement of FIG. 1 presumably is required to provide exposure of a sufficient volume of magnetic magnetoresistive material to receive an adequate signal while still maintaining adequate lateral spatial resolution. This tends to increase the average height above the disk surface of the magnetoresistive layer and so to reduce the strength of the average magnetic field experienced by the layer since this magnetic field decreases with increasing distance from the disk.

As a result, the planar horizontal geometry permitted for the arrangement shown in FIG. 2 has the advantage of permitting smaller separation from the disk and a location in a region of higher magnetic field than the vertical planar geometry associated with the arrangement of FIG. 1.

It is to be noted that the figure of merit is $$\frac{\Delta R}{R},$$

so that it becomes important to know how the resistance changes with magnetic field strength.

Figure 3:
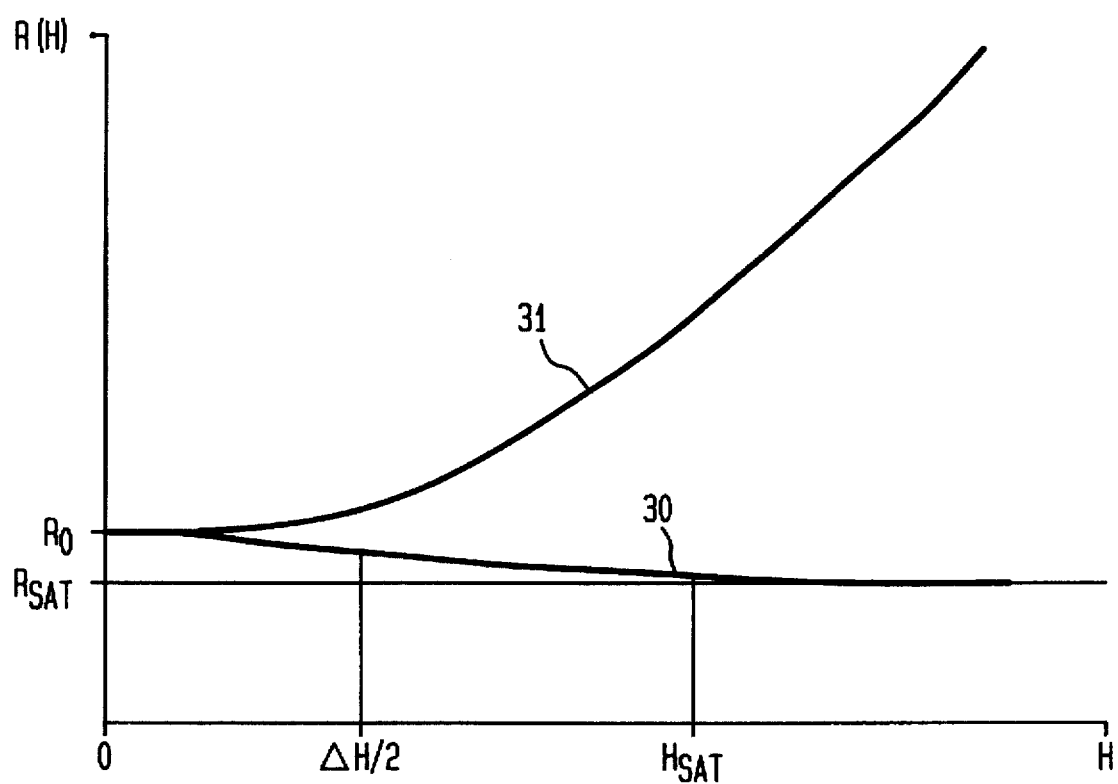
FIG. 3 shows curves comparing the magnetoresistive response to magnetic field intensity of the non-magnetic magnetoresistive semiconductor form and the magnetic magnetoresistive form of reading sensors.

In FIG. 3 are shown typical plots of the resistances of the magnetic magnetoresistive material shown in FIG. 1 and the non-magnetic magnetoresistive semiconductor structure shown in FIG. 2. as functions of the strength of the magnetic field. It is to be noted that the resistance of the magnetic magnetoresistive material, represented by curve 30, gradually decreases to a saturation value so that at high fields, the $$\frac{\Delta R}{R}$$

figure of merit saturates. Although biasing may, in principle, minimize this figure of merit reduction, the requisite hardware necessarily limits the minimum average distance between the head and media so that, in practice, biasing for this purpose will not be effective. On the other hand, with the non-magnetic magnetoresistive semiconductor sensors of the kind proposed for the practice of the invention, the resistance increases quadratically with magnetic field as seen with curve 31 so $$\frac{\Delta R}{R}$$

can be higher the stronger the magnetic field change sensed by the active layer. Accordingly, the planar horizontal arrangement of FIG. 2 can profit in the form of a higher figure of merit because its smaller separation permits it to be in a region of higher magnetic field strength.

For use in the semiconductor arrangement of FIG. 2, undoped monocrystalline compound semiconductors are presently believed to have the best combination of properties. Of the Group III-Group V compound semiconductors, InSb is thought to have the highest electron mobility at temperatures of greatest practical interest, the characteristic of principal interest for sensitivity. Moreover, the room temperature mobility can be increased further, when higher values are needed. One method involves applying a bending stress to the crystal by mounting it on a sufficiently curved surface so that the band gap is decreased and the electron mobility increased. Another method involves cooling the crystal, for example, by mounting the crystal in an appropriate environment on a micro-peltier cooling chip, as has been done to cool gallium arsenide crystals in low noise amplifiers.

Among the Group II–Group VI compound semiconductors, an active layer of especially high sensitivity would be provided by the ternary compound $Hg_xCd_{1-x}Te$ where x has a value of about 0.17. In this material, the band gap is very small and tunable by varying x and the electron mobility is very high.

It can be appreciated that the particular examples described are merely exemplary of the general principles of the invention. Other materials and other arrangements can be devised by a worker in the art without departing from the spirit and the scope of the invention.

What is claimed is:

1. A non-magnetic semiconductive magnetoresistive head for reading a magnetic pattern as a series of magnetic domains along tracks in a data storage device comprising a non-magnetic semiconductive wafer of a monocrystalline material, consisting substantially of $Hg_{0.17}Cd_{0.83}Te$, exhibiting high electron mobility at the temperature intended for operation and having at least one substantially planar surface;

electrode means including an inner electrode and an outer electrode surrounding the inner electrode on the planar surface of the semiconductive wafer; and means for supporting the planar surface of the semiconductive wafer spaced adjacent to the magnetic pattern of the data storage device such that when the magnetic pattern is scanned, the external fields associated with a reversal in the direction of polarization of the domains of the magnetic pattern intercept the semiconductive wafer in a direction substantially perpendicular to the planar surface of the wafer.

2. A reading head in accordance with claim 1 in which the inner electrode is a stripe and the outer electrode is substantially rectangular.

3. A reading head in accordance with claim 2 in which the longer dimension of the outer electrode substantially matches the transverse dimension of the track.

4. A reading head in accordance with claim 1 in which the electron mobility of the material of the wafer is at least $5\times10^4$ cm$^2$/V sec.

5. A reading head in accordance with claim 1 in which the series resistance between the inner and outer electrodes is about twenty ohms.

6. A reading head in accordance with claim 5 in which the longer dimension of the rectangular electrode is about 5 microns and the shorter dimension between about 500 Angstroms and 1000 Angstroms.

* * * * *